United States Patent
Edmondson

(10) Patent No.: US 7,008,546 B2
(45) Date of Patent: Mar. 7, 2006

(54) OIL, WATER AND GAS SEPARATOR FOR SWAYING SERVICE

(76) Inventor: Jerry M Edmondson, 2 Escapade Ct., Newport Beach, CA (US) 92663

( * ) Notice: Subject to any disclaimer, the term of this patent is extended or adjusted under 35 U.S.C. 154(b) by 0 days.

(21) Appl. No.: 10/337,502

(22) Filed: Jan. 7, 2003

(65) Prior Publication Data

US 2004/0129633 A1    Jul. 8, 2004

(51) Int. Cl.
*B01D 17/028*    (2006.01)

(52) U.S. Cl. .................... 210/801; 210/802; 210/521; 210/539; 210/540

(58) Field of Classification Search ............... 210/801, 210/802, 86, 104, 521, 522, 539, 540, 537
See application file for complete search history.

(56) References Cited

U.S. PATENT DOCUMENTS

| | | | | |
|---|---|---|---|---|
| 554,815 A | * | 2/1896 | Field | 210/521 |
| 2,009,510 A | * | 7/1935 | Mobley | 210/521 |
| 2,090,813 A | * | 8/1937 | Schumacher | 210/802 |
| 2,181,687 A | * | 11/1939 | Walker | 210/521 |
| 2,261,101 A | * | 10/1941 | Erwin | 210/522 |
| 2,614,649 A | * | 10/1952 | Walker et al. | 210/521 |
| 2,693,880 A | * | 11/1954 | Schoenfeld | 210/521 |
| 3,752,318 A | * | 8/1973 | DeRouen et al. | 210/522 |
| 4,122,016 A | * | 10/1978 | Tao et al. | 210/521 |
| 4,308,136 A | * | 12/1981 | Warne, Jr. | 210/540 |
| 4,802,978 A | * | 2/1989 | Schmit et al. | 210/104 |
| 5,362,386 A | * | 11/1994 | Takasugi | 210/540 |
| 6,517,719 B1 | * | 2/2003 | Burwell | 210/DIG. 5 |

\* cited by examiner

*Primary Examiner*—Christopher Upton

(57) ABSTRACT

A cylindrical vertical oil, water and gas separator that incorporates the known advantage of a horizontal flow path, when utilizing the force of gravity to separate a mixture of flowing fluids into distinct laminar layers, while providing a means for maintaining the dynamic equilibrium of the disparate layers of the fluids even when the oil, water and gas separator is swaying back and forth as might happen if the oil, water and gas separator is installed on the deck of a ship.

2 Claims, 1 Drawing Sheet

OIL, WATER AND GAS SEPARATOR FOR SWAYING SERVICE

FIELD OF THE INVENTION

This invention relates to apparatus and methods for processing a flowing mixture of oil, water and gas for the purpose of separating the oil water and gas into disparate components and cleaning each of the oil, water and gas components sufficiently for each to be delivered into oil, water and gas pipelines.

BACKGROUND OF THE INVENTION

The advantage of incorporating a horizontal flow path, as opposed to a vertical upward flow path, when using the force of gravity to separate oil, water and gas into disparate laminar layers is well known. With a vertical upward flow path the upward momentum presents a directly opposing force to the force of gravity, thus impeding the separation of the fluids much more than the resistance to the separation that is imposed when the flow is moving horizontally. To accomplish the horizontal flow path the containment vessels utilized are generally of an elongated horizontal cylindrical configuration with a length to diameter ratio exceeding 3:1 and with fluids stratified in relatively thin layers. This is a very efficient arrangement when the vessels are anchored and level but has the disadvantage of a minor longitudinal tilting causing the upper and the lower strata's to be pinched into a wedge shape that can greatly reduce the volumetric capacity allotted to a particular fluid and can cause misdirection of the various fluid flows.

This invention introduces a containment vessel that is configured to attain the processing advantages of the horizontal flow path relative to gravity separation while allowing for a severe tilting of the vessel without significantly changing the geometry of the fluid containment spaces or causing a misdirection of the fluid flow paths.

SUMMARY OF THE INVENTION

This invention is well suited for operation in oil fields anywhere a small footprint is desirable and is particularly well suited for processing petroleum flow streams originating from wells that are located at water bound locations such as the oceans, seas or lakes where the processing equipment is likely to be installed on the deck of ships, barges or floating production platforms whereon the equipment is subjected to a swaying motion due to the pitch and roll of the host structure caused by surface disturbance of the water upon which the host structure floats.

This invention provides for a much more efficient processing performance than is normally produced by containment vessels of a similar vertical cylindrical shape with the common upward flow direction or the elongated cylindrical horizontal configuration when exposed to a swaying motion in as much as this invention incorporates some novel internal structures within a vertical cylindrical containment vessel that direct the flow paths of the fluids in a substantially horizontal direction while maintaining a dynamic equilibrium of the flowing fluid strata's even when the containment vessel is subjected to considerable tilting and swaying.

Figure 1:
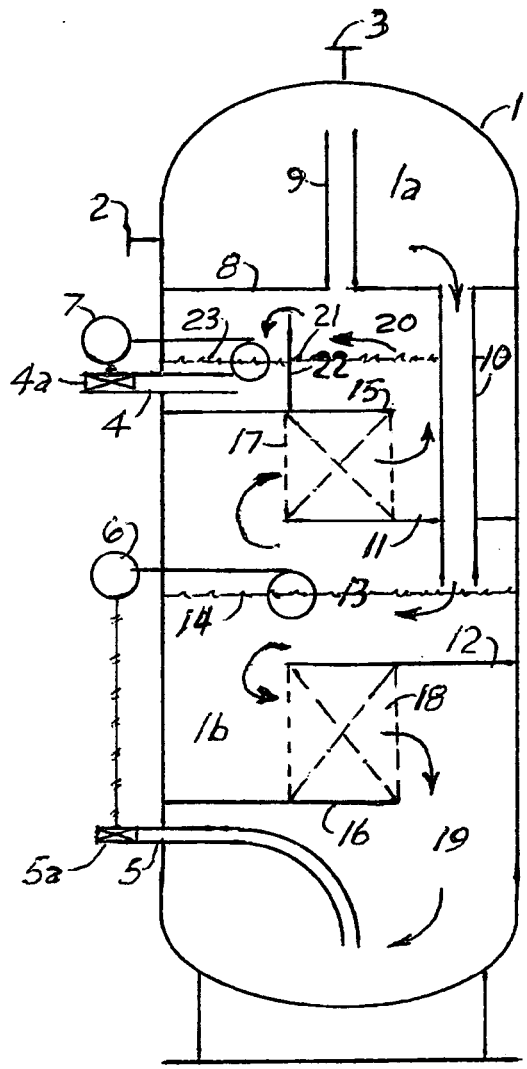
FIG. 1. is a side view schematic showing all of the essential elements of the preferred embodiment of this invention?
Figure 3:
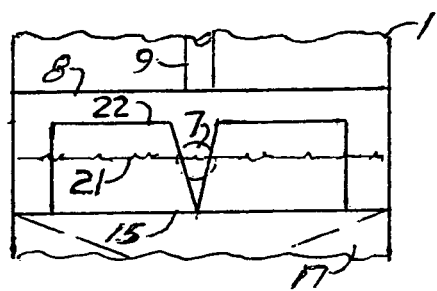
FIG. 3. is a cross section view of the portion of the vessel that contains the oil box and illustrates a configuration of the oil spillover weir?
Figure 2:
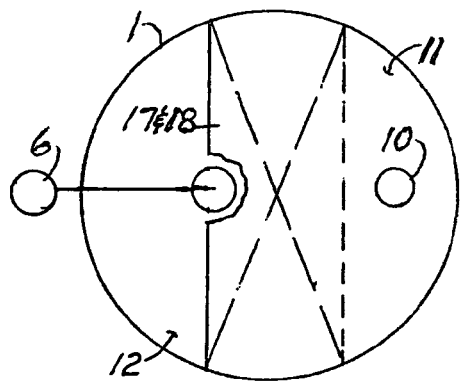
FIG. 2. is a cross section top view of the containment vessel showing one of the semi-circular baffles that serve to direct the flowing fluids in a horizontal flow path.

DETAILED DESCRIPTION OF THE PREFERRED EMBODIMENT (Referring to the Figures)

There is an enclosed vertical cylindrical containment vessel 1 with an inlet connection 2, a gas outlet connection 3, an oil outlet connection 4 with an oil discharge control valve 4a, a water outlet connection 5 with a water discharge control valve 5a, a water level sensor 6 and an oil level sensor 7. A solid circular baffle 8, to provide a confined space 1a wherein gas vapor is separated from the flowing oil and water liquid mixture, partitions an upper portion of the containment vessel. A pipe 10 serves as a conduit to deliver the flowing oil and water mixture into the lower chamber 1b wherein the liquid mixture is directed on a horizontal flow path. Semi-circular solid baffles 11 and 12 define a confined space 13 within which the oil and water interface 14 is established. Semi-circular solid baffles 15 and 16 serve to define a space in which the oil and water streams are directed on a horizontal flow path. To establish a plug flow of the oil and the water through their respective flow spaces it is advisable to incorporate a commercially available coalescing element 17 and 18 transverse to the flow path of each. The water is directed to a resting space 19 before it makes it's final exit.

The oil is directed to a resting space 20 in which the top oil level 21 is established by an overflow weir 22. Gas liberated in the lower chamber is evacuated into the upper chamber through a pipe conduit 9. The oil flows into a confined space wherein the upper oil level 23 is controlled by the oil level sensor 7.

I claim:

1. A cylindrical containment vessel for receiving a flowing mixture of gas, oil and water to separate the said mixture into disparate layers of gas, oil and water and discharge each separately, said vessel for installation on a flat substantially horizontal surface of a host structure that floats on a body of water, said containment vessel to have its center line vertical and perpendicular to the said horizontal surface, and including top and bottom end closures comprising, in combination:
   a) an inlet located in said vessel near the top end enclosure for receiving the gas, oil and water mixture,
   b) a first horizontally oriented baffle plate below said inlet dividing said vessel into upper and lower compartments with a first conduit for delivering oil and water from said upper compartment into said lower compartment and a second conduit for delivering gas from said lower compartment into said upper compartment,
   c) an oil outlet located in the upper region of the said lower compartment,
   d) a second baffle plate, parallel to said first baffle plate located below said oil outlet said second baffle plate with an opening near the wall of the said containment vessel at a location opposite said oil outlet and having a vertical barrier plate perpendicular to said second baffle plate located between said oil outlet and said opening with its ends sealed at the wall of said containment vessel and its bottom edge sealed at the said second baffle, said barrier plate having a V notch opening with the wide end of the V at the top edge of said barrier plate said V notch being located at the midpoint of said barrier plate, e) a water outlet located in the lower region of said lower compartment, f) a third baffle plate located above said water outlet parallel to said first and second baffle plates with an opening near the wall of said containment vessel opposite said water outlet, g) a fourth baffle plate and a fifth baffle plate, located inside said containment vessel between the said second and third baffle plate parallel to said first, second, and third baffle plates each with an opening near the wall of said containment vessel said opening in a location that is opposite the opening of said second and third baffle plates, and a gas outlet located near the dead center of said top closure.

2. A method for separating a flowing mixture of gas, oil and water into disparate layers of gas, oil and water in a containment vessel located on a host structure with said host structure floating on the surface of a body of water and delivering each separately, comprising: introducing said mixture into a separator which comprises a) a vertically oriented containment vessel having an inlet for receiving the flowing mixture, a gas outlet, oil outlet and water outlet, a first baffle plate below said inlet dividing said vessel into upper and lower compartments, a first conduit to deliver the oil and water from said upper compartment into said lower compartment and second conduit to deliver gas from said lower compartment each of said baffles having an opening near a wall of said vessel to said upper compartment, b) substantially horizontally oriented baffles located within said lower compartment to direct the oil and water flow in a horizontal flow direction, c) said oil outlet contained within a collection box located in an upper region of said lower compartment said collection box having a spillover weir with a V notch through which the oil enters the collection box, said point of the V notch at the bottom edge of said spillover weir at approximate dead center of the upper oil surface in said upper compartment, said collection box being formed by a vertical barrier plate extending from an uppermost of said horizontally oriented baffles between said oil out let and said opening d) said water outlet located in a lower region of said lower compartment bellow said plurality of horizontally oriented baffles with a discharge conduit having its entry near dead center of the bottom of said containment vessel and said gas outlet located near dead center of the top of said upper compartment.

* * * * *